Nov. 24, 1953  A. A. GRIFFITH  2,660,400
BLADE FOR TURBINES OR COMPRESSORS
Filed Nov. 14, 1949  2 Sheets-Sheet 1
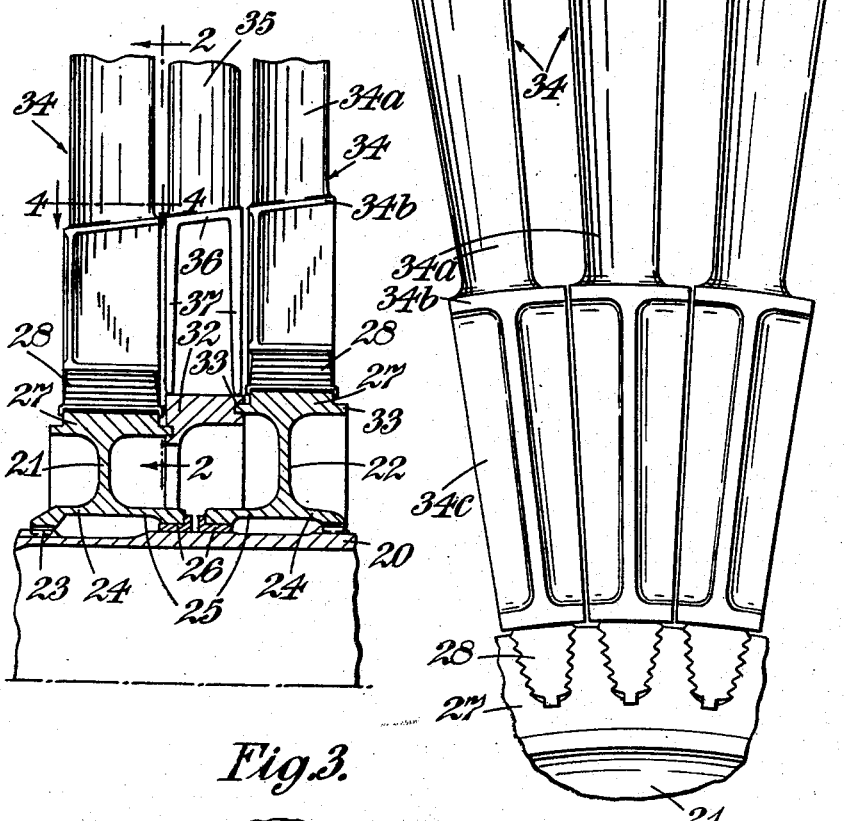
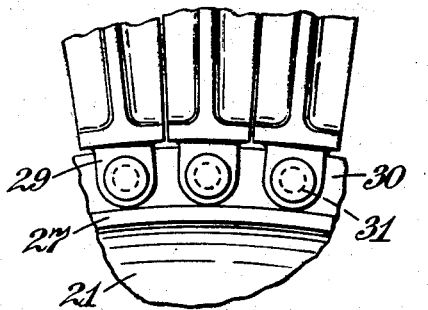
INVENTOR
A. A. GRIFFITH
by Wilkinson Mawhinney
Attys.

Nov. 24, 1953　　　A. A. GRIFFITH　　　2,660,400
BLADE FOR TURBINES OR COMPRESSORS
Filed Nov. 14, 1949　　　　　　　　　2 Sheets-Sheet 2
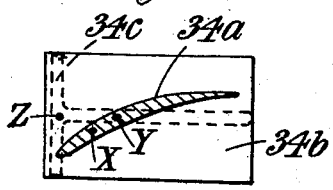
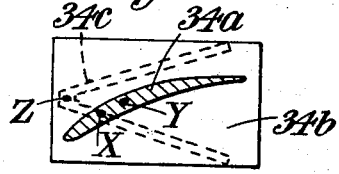
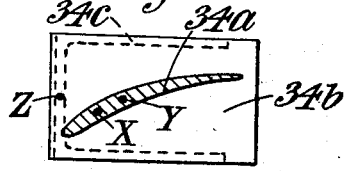
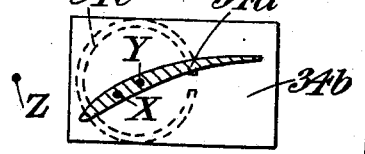
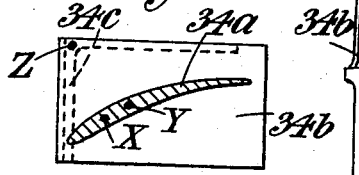
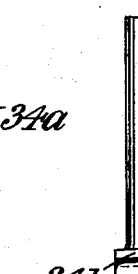
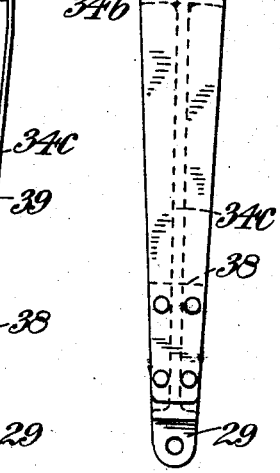
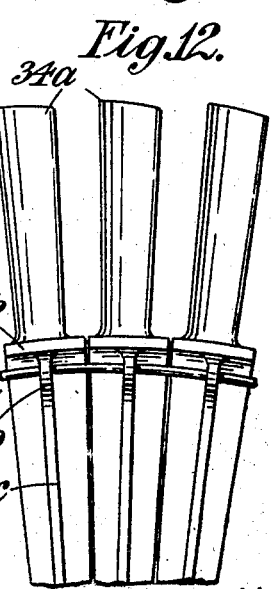
INVENTOR
A. A. GRIFFITH
by Wilkinson Mawhinney
Attys.

Patented Nov. 24, 1953

2,660,400

UNITED STATES PATENT OFFICE 2,660,400

BLADE FOR TURBINES OR COMPRESSORS

Alan Arnold Griffith, Derby, England, assignor to Rolls-Royce Limited, Derby, England, a British company Application November 14, 1949, Serial No. 126,949

Claims priority, application Great Britain November 25, 1948

11 Claims. (Cl. 253—77)

This invention relates to blading elements such as are employed in radial or axial flow compressors or turbines, for instance compressors or turbines of gas-turbine engines.

In use, the blading elements are subjected to aerodynamic loading and as a result partake of torsional vibrations about axes extending lengthwise of the blade portions of the element, that is, from the roots to tips of the blade portions. These torsional vibrations are a frequent cause of failure of the blading elements.

It is an object of this invention to provide an improved construction of blading element whereby the chance of failure due to torsional vibration is reduced.

According to the present invention, a blading element comprises a blade portion extending from a supporting stem which has a root attachment at its end remote from the blade portion and is characterised in that the blade portion and supporting stem have such forms that they tend to be twisted in opposite directions by aerodynamic loads experienced in use. In this way, the angular displacement of the blade portion relative to the root attachment is reduced so reducing tendency to failure.

In a blading element for an axial-flow compressor or turbine, for instance, the flexural axis of the blade portion will lie to one side of a plane which is at right angles to the compressor or turbine axis and contains the aerodynamic axis of the blade portion, and the flexural axis of that plane. The aerodynamic axis may be defined as the locus of the centres of aerodynamic pressure of each section of the blade portion, and the aerodynamic axis extends lengthwise of the blade between its flexural axis and its leading edge.

The supporting stem may be in the nature of a T, V or angle section girder with the blade portion extending from one end thereof and the root attachment at the other end. With a blading element having such a supporting stem, the junction of the webs of the section, along which junction the flexural axis of the stem extends, is preferably arranged to be close to the leading edge of the platform element normally provided at the root end of the blade portion to form with other platforms a defining wall of the working fluid passage of the compressor or turbine.

The supporting stem may be in the nature of a channel-section girder whereof the flexural axis extends along the centre line of the base web of the channel section, or of circular section split along one side whereof the flexural axis extends along a line diametrically opposite the split and in these cases the stem will also preferably be so arranged in relation to the blade portion that the flexural axis is close to the leading edge of the platform associated with the blade portion.

In all these cases, the flexural axis of the stem will be spaced substantially from the flexural axis of the blade portion and the axes will lie on opposite sides of the aerodynamic axis of the blade portion.

According to a feature of this invention, the stem may be arranged to carry a device acting on the blade portion or blade platform associated with it for damping the torsional vibrations of the blade portion. For example, a strip spring may be secured to the stem at a point in its length remote from the blade portion and at a point in the stem section remote from the flexural axis of the stem, and the spring may be arranged to bear by its free end on the trailing edge of the blade platform, so that vibrations of the platform due to torsional vibrations in the blade portion are opposed by the frictional effect of the spring. In this way torsional vibrations of the blading element are damped. In another arrangement, for this purpose a lug is formed on the underside of the platform adjacent its trailing edge and connected with the stem, and a hole is provided in the lug; a damping wire is then threaded through the lugs of an assembled ring of blading elements.

The blade platforms will have such circumferential dimensions that when the blade elements are assembled the platforms are slightly spaced. Preferably the circumferential spacing between adjacent platforms is such as to provide mechanical damping by interabutment, restraining excessive flexural or pivotal movement of the stem about its root fixing.

Some embodiments of blading element according to this invention will now be described, reference being made in the description to the accompanying drawings in which—

Figure 1 is a partial axial section through an axial-flow compressor,

Figure 2 is a section on the line 2—2 of Figure 1 on a larger scale.

Figure 3 illustrates a modified form of means for attaching a blading element to a compressor rotor, Figure 4 is a diagrammatic section on the line 4—4 of Figure 1, Figures 5, 6, 7 and 8 are views corresponding to Figure 4 of modified forms of blading element, Figures 9 and 10 illustrate in side and front elevation a further modified form of blading element, and Figures 11 and 12 illustrate in side and front elevation a further modification of blading element.

Referring to Figures 1 and 2, there is illustrated part of an axial-flow compressor which comprises a central rotor shaft 20 carrying a series of disc members of which two 21 and 22 are shown, which discs are torsionally engaged with the shaft 20 through inter-engaging splines 23, the splines on the discs 21 and 22 being formed at the free ends of axial sleeve-like portions 24 extending from the centres of the discs. The discs 21 and 22 are centred on the shaft 20 through sleeve-like portions 25 extending from the centres of the discs in a direction opposite to the sleeve-like portions 24 and having thickened free ends which engage the shaft through inserted collars 26.

The discs 21, 22 have thickened rim portions 27 on which the blading elements of the compressor are mounted in any convenient manner. For example, as shown in Figures 1 and 2, the rotor blading elements 34 are provided with fir-tree root attachments 28 which engage in suitably shaped axially-directed recesses formed in the rim portions 27. Alternatively, as shown in Figure 3, the root attachments may be of the pin and lug type, the blading elements being formed with lugs 29 at their root ends which lugs lie on either side of a radial flange 30 on the disc rim 27, pivot pins 31 being provided to extend through the lugs 29 and flange 30 to retain the blading elements in position on the rim with a limited pivotal freedom.

Referring again to Figure 1, the discs forming the rotor of the compressor are held in axially-spaced relation by spacer rings 32 which are formed on their axially-directed faces with circumferential grooves in which axially-directed ribs 33 on the disc rims 27 engage thereby to locate the spacer ring coaxially with respect to the discs.

A single ring of blading elements 34 is carried on each disc such as the discs 21 and 22, there being one disc for each stage of the compressor rotor blading. Between each ring of blading elements 34 there is provided a ring of stator blades 35 which will be supported from the compressor casing (not shown) and in the construction illustrated the stator blades 35 are provided at their radially inner ends with platform elements 36 which combine to afford a portion of the wall of the working annulus of the compressor. The platforms 36 are provided on their sides remote from the blades 35 with radially extending flanges 37 which extend inwards towards the spacer rings 32 and have their radially inner edges just clear of the spacer rings 32.

The rotor blading elements 34 comprise blade portions 34a which work on the fluid passing through the axial-flow compressor and the blade portions 34a spring from platforms 34b at their root ends which platforms together form a portion of the wall of the working fluid annulus of the compressor and form smooth continuations of the wall portions formed by the platforms 36. The platforms 34b are connected with the root attachments of the blading elements by means of stem portions 34c the form and purpose of which will appear hereafter.

In operation of an axial flow compressor the blading elements 34 are subjected to a varying aerodynamic loading which causes the blades to partake of torsional vibrations which torsional vibrations are a frequent cause of failure of the blading elements.

To reduce the extent of the torsional vibrations of the blade portions 34a of the blading elements 34 relative to the root attachments 28, the stem portions 34c are given such a form and are so arranged that the flexural axes of the blade portions 34a and the stem portions 34c lie on opposite sides of a plane at right angles to the axis of the compressor and containing the aerodynamic axes of the blade portions 34a.

The stem portions 34c may take various forms some of which are illustrated in Figures 4 to 8. Referring to Figure 4, the stem portion is in the nature of a T-section girder whereof the cross web of the section is located close to the leading edge of the blade platform 34b. The centre of aerodynamic pressure on the blade portion 34a is indicated at X and the flexural axis of the blade portion 34a is indicated at Y. The flexural axis of the stem portion 34c lies along the junction of the webs of the section and is indicated at Z, and it will be seen that the flexural axes Y and Z will lie on opposite sides of a plane which is at right angles to the compressor axis and contains the aerodynamic axis of the blade which is the locus of the points X for each section of the blade. With such an arrangement the vibrations of the blade portion 34a due to the aerodynamic loading will be at the opposite direction to those of the stem portion 34c, so that the extent of the vibrations of the blade portion 34a relative to the root attachment of the blading element will be reduced.

Referring now to Figure 5, there is illustrated a form of blading element in which the stem portion 34c is in the nature of a V-section girder with the junction of the webs of the girder located close to the leading edge of the blade platform 34b. It will be seen that the flexural axes Y and Z of the blade portion 34a and stem portion 34c respectively have a similar disposition with respect to the aerodynamic axis of the blade portion 34a as in the construction illustrated in Figure 4.

Figure 6 illustrated another construction in which the stem portion 34c is in the nature of a channel girder with the base of the channel lying close to the leading edge of the blade platform 34b. The flexural axis of the stem portion extends along the centre of the base portion of the channel section so that the disposition of the flexural axes Y and Z and of the aerodynamic axis X are similar to dispositions achieved with constructions such as are illustrated in Figures 4 and 5.

Referring now to Figure 7 there is illustrated a construction of blading element in which the stem portion 34c is of hollow circular section with a split extending longitudinally along one side of the stem. The split is located remote from the leading edge of the blade platform 34b. With this form of stem the flexural axis Z of the stem 34c lies beyond the stem on the side thereof remote from the split, so that in this construction the flexural axis Z of the stem 34c lies beyond the leading edge of the blade platform 34b on the side thereof remote from the blade portion 34a. However, the flexural axes Y and Z of the blade portion 34a and stem portion 34c respectively again lie on opposite sides of the plane containing the aerodynamic axis, so that the extent of the vibrations of the blade portion 34a with respect to the root attachment of the blading element will be reduced.

Referring now to Figure 8, yet another modification is illustrated and in this construction the stem portion 34c is in the nature of an angle girder located with the junction between the webs of the section close to the leading edge of the blade platform and with one web of the section extending across the blade platform close to its leading edge. The flexural axis Z of the stem portion in this construction extends along the stem close to the junction between the webs of the angle section so that as in the previous constructions the flexural axes Y and Z lie on opposite sides of the plane containing the aerodynamic axis X.

In addition to so forming and locating the stem that its flexural axis lies on the opposite side of the plane containing the aerodynamic axis of the blade portion from the flexural axis of the blade portion, means may be provided for effecting frictional damping of the vibrations of the blade portion or of the blade platform associated with it.

One such arrangement is shown in Figures 9 and 10 which illustrate a blade having a stem portion similar to that illustrated in Figure 4 and having a root attachment of the type illustrated in Figure 3. The stem 34c is provided at its end remote from the blade platform 34b and at its trailing edge (remote from the flexural axis) with a flange 38 to which is riveted a strip spring 39 which extends radially outwards and bears by its free end on the rear face of the blade platform 34b. Thus vibrations of the blade platform 34b, due to torsional vibrations of the blade portion 34a, are damped by the frictional effect of the spring 39 bearing on its trailing face.

A second such arrangement is shown in Figures 11 and 12. In this arrangement lugs or pins 40 are formed on the under surface of the blade platform as an extension of the trailing edge of the stem and holes are formed in the lugs or pins 40. After assembly of a ring of such blades, a wire 41 is threaded through the holes around the ring of blades and this wire acts to damp the oscillations of the blade platforms and thus to reduce the displacement of the blade portions 34a relative to the root attachments of the blades as a result of torsional vibration.

It will be noticed that in each of the constructions illustrated the blade platforms 34b are slightly spaced from one another. Such circumferential spacing between adjacent platforms may be such as to provide mechanical damping by interabutment of the platforms restraining excessive flexural or pivotal movement of the stem about its root fixing.

I claim:

1. A blading element for an axial flow compressor or turbine comprising a blade portion, a supporting stem from which said blade portion extends and which has its flexural axis in torsion lying on the opposite side of a plane at right-angles to the axis of the compressor or turbine and containing the aerodynamic axis of the blade portion to that on which the flexural axis of the blade portion lies, and a root attachment at the end of said supporting stem remote from said blade portion.

2. A blading element for an axial flow compressor or turbine comprising a blade portion, a supporting stem which has its flexural axis in torsion lying on the opposite side of the plane at right-angles to the axis of the compressor or turbine and containing the aerodynamic axis of the blade portion to that on which the flexural axis of the blade portion lies, a blade platform from opposite faces of which said blade portion and said supporting stem extend, and a root attachment at the end of said supporting stem remote from said blade platform.

3. A blading element as claimed in claim 2, characterised in that the supporting stem is in the nature of a T-section girder with the junction of the webs of the section located close to the leading edge of the blade platform.

4. A blading element as claimed in claim 2, characterized in that the supporting stem is in the nature of an angle section girder, with the junction of the webs of the section located close to the leading edge of the blade platform.

5. A blading element as claimed in claim 4, wherein the angle of the angle-section girder is a right-angle.

6. A blading element as claimed in claim 2, characterised in that the supporting stem is in the nature of a channel section with its base lying parallel to and close to the leading edge of the blade platform.

7. A blading element as claimed in claim 2, characterised in that the stem is of hollow circular section split longitudinally along one side, the supporting stem being so connected to the blade platform that its flexural axis in torsion lies close to the leading edge of the blade platform.

8. A blading element for an axial flow compressor or turbine comprising a blade portion, a supporting stem having its flexural axis in torsion lying on the opposite side of a plane at right-angles to the axis of the compressor or turbine and containing the aero-dynamic axis of the blade portion to that on which the flexural axis of the blade portion lies, a blade platform from opposite faces of which said blade portion and said supporting stem extend, a root attachment at the end of said supporting stem remote from said blade platform, and frictional damping means acting on said blade platform.

9. A blading element as claimed in claim 8, wherein said frictional damping means comprises a lug on the under surface of the blade platform adjacent its trailing edge which lug is formed with a hole through which a damping wire can be threaded when the blading element is assembled in a compressor or turbine together with a plurality of like blades.

10. A blading element for an axial flow compressor or turbine comprising a blade portion, a supporting stem having its flexural axis in torsion lying on the opposite side of a plane at right angles to the axis of the compressor or turbine and containing the aero-dynamic axis of the blade portion to that on which the flexural axis of the blade portion lies, a blade platform from opposite faces of which said blade portion and said supporting stem extend, a root attachment at the end of said supporting stem remote from said blade platform, and frictional damping means acting on said blade platform, said frictional damping means comprising a strip spring secured to the supporting stem at a point in its length remote from the blade portion and at a point in the stem section remote from the flexural axis of the stem, and arranged to bear by its free end on the trailing face of the blade platform.

11. A blading element for an axial flow compressor and turbine comprising a blade portion, and supporting stem having a cross-section that has only one axis of symmetry and having its flexural center displaced from its centroid, said stem being so oriented with respect to the blade that the flexural axis of the stem is forward of the aero-dynamic axis of the blade, when the loci of centroids of the blade and stem are substantially colinear.

ALAN ARNOLD GRIFFITH.

References Cited in the file of this patent

UNITED STATES PATENTS

| Number | Name | Date |
|---|---|---|
| 1,434,414 | Stoney | Nov. 7, 1922 |
| 1,544,318 | Hodgkinson | June 30, 1925 |
| 1,554,614 | Allen | Sept. 22, 1925 |
| 2,241,782 | Jendrassik | May 13, 1941 |
| 2,579,745 | Lombard | Dec. 25, 1951 |

FOREIGN PATENTS

| Number | Country | Date |
|---|---|---|
| 329,261 | Great Britain | May 15, 1930 |
| 587,588 | Great Britain | Apr. 30, 1947 |